US009607287B2

(12) United States Patent
Schirmer et al.

(10) Patent No.: US 9,607,287 B2
(45) Date of Patent: Mar. 28, 2017

(54) INTEGRATED VIEW OF MULTI-SOURCED INFORMATION OBJECTS

(75) Inventors: Andrew L. Schirmer, Andover, MA (US); Elizabeth A. Brownholtz, Andover, MA (US); Sandra L. Kogan, Newton, MA (US); Michael Muller, Medford, MA (US)

(73) Assignee: International Business Machines Corporation, Armonk, NY (US)

( * ) Notice: Subject to any disclaimer, the term of this patent is extended or adjusted under 35 U.S.C. 154(b) by 1185 days.

(21) Appl. No.: 12/017,015

(22) Filed: Jan. 19, 2008

(65) Prior Publication Data

US 2009/0187580 A1    Jul. 23, 2009

(51) Int. Cl.
*G06F 17/30* (2006.01)
*G06Q 10/10* (2012.01)

(52) U.S. Cl.
CPC ................... *G06Q 10/10* (2013.01)

(58) Field of Classification Search
CPC ........... G06F 3/1204; G06F 2209/5021; G06F 9/5038; G06F 17/30
USPC ............... 715/808, 838, 835, 742, 764, 751; 709/206, 207, 240
See application file for complete search history.

(56) References Cited

U.S. PATENT DOCUMENTS 7,185,290 B2 * 2/2007 Cadiz et al. .................. 715/838
7,743,340 B2 * 6/2010 Horvitz et al. ............... 715/808
2005/0246327 A1 * 11/2005 Yeung ............... G06F 17/30067
2006/0067578 A1 * 3/2006 Fuse ....................... G09B 5/067 382/190
2007/0255850 A1 * 11/2007 Gould .................. G08G 5/0026 709/240
2008/0052372 A1 * 2/2008 Weber ............... G06F 17/30265 709/217

OTHER PUBLICATIONS

Microsoft Computer Dictionary definition of "grid". Copyright 2002, Microsoft Corporation. 3 pages.*

* cited by examiner

*Primary Examiner* — Amy Ng
*Assistant Examiner* — Sang H Kim
(74) *Attorney, Agent, or Firm* — Steven M. Greenberg, Esq.; CRGO Law

(57) ABSTRACT

Embodiments of the present invention address deficiencies of the art in respect to user interface rendering for information objects and provide method, system and computer program product for an integrated view of multi-sourced information objects. In an embodiment of the invention, an attention manager data processing system can be provided. The system can include integrated view logic executing in a computing device and an attention manager user interface generated by program code of the integrated view logic. The user interface can include a grid of quadrants. Each quadrant can correspond to a unique combination of importance and urgency. The quadrant further can include representations of underlying information objects from multiple different sources of information objects. Correspondingly, each information object can include a respective importance and urgency consistent with a corresponding one of the quadrants.

16 Claims, 2 Drawing Sheets

US 9,607,287 B2

INTEGRATED VIEW OF MULTI-SOURCED INFORMATION OBJECTS

BACKGROUND OF THE INVENTION

Field of the Invention

The present invention relates to user interface management and more particularly to information integration into a dashboard view.

Description of the Related Art

The personal computer revolution of the twentieth century enabled new levels of productivity for those who chose to adopt the personal computer as a principal platform for time management. From the outset, personal information managers have been a mainstay of personal computing. Generally, a personal information manager provides computing logic to create and maintain tasks, activities and meetings, and contacts through a simple, easy to use interface. To meet the needs of those with a vast number of tasks and meetings, summary "journal" user interface views allow the end user to view all tasks and meetings in a single screen. Further, in order to call attention to entries of importance or urgency, end users can sort meetings and tasks by due date and can render the most urgent and important of entries in a different color.

Organizational experts recognize the deficient nature of the journal view of a personal information manager in the face of an unmanageable volume of important and urgent entries. In particular, the journal view does little to prevent important events from becoming obscured by other organizational elements in the journal display. Accordingly, leading experts recommend the use of a grid in which activities are arranged by importance and urgency. In this way, at a glance, viewers can focus only on activities of importance, only on activities which are urgent, or only on activities which are both important and urgent.

Yet, the grid expressed by organizational experts provides only for the arrangement of activities and does not account for other types of organizational elements and non-organizational information elements. To that end, understanding the nature of an important or urgent organization element like a task or meeting often can require a visualization of a relationship between the organizational elements and other non-organizational, informational elements. For instance, it is often not enough to recognize the urgency of a scheduled meeting, but it may also be necessary to visualize contacts scheduled to attend the meeting, or resources necessary to conduct the meeting, or tasks that are pre-requisite to the meeting.

The grid system of the state of the art, however, manages only a unitary type of organizational element—namely the activity. Generally, these activities can be found from within a singular source. The reality of the modern workflow, however, is that scheduled organizational elements seldom arise in a vacuum and most often rely upon other information objects. Further, these information objects can be provided by different information sources. Yet, in order to marshal other types of information objects into a single view, end users must revert then to a traditional journal view.

BRIEF SUMMARY OF THE INVENTION

Embodiments of the present invention address deficiencies of the art in respect to user interface rendering for information objects and provide a novel and non-obvious method, system and computer program product for an integrated view of multi-sourced information objects. In an embodiment of the invention, an attention manager data processing system can be provided. The system can include integrated view logic executing in a computing device and an attention manager user interface generated by program code of the integrated view logic. The user interface can include a grid of sectors, for example four quadrants. Each quadrant can correspond to a unique combination of importance and urgency. The quadrant further can include representations of underlying information objects from multiple different sources of information objects. Correspondingly, each information object can include a respective importance and urgency consistent with a corresponding one of the quadrants. It is to be recognized, however, that the invention is not expressly limited to four quadrants and multiple different sectors can be provided, for example each sector can correspond to a unique combination of a degree of importance and a degree of urgency.

In another embodiment of the invention, a method for managing an integrated view of multi-sourced information objects can be provided. The method can include retrieving different information objects of different types from different sources of information objects, determining an importance and urgency for each of the information objects, and displaying a representation of each of the information objects in a quadrant in a grid selected according to the importance and urgency of the representation. The method further can include filtering the grid to display representations for underlying information objects of a selected type. The method yet further can include displaying information for an information object responsive to a proximity event in the grid for a corresponding representation of the information object.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for an integrated view of multi-sourced information objects. In accordance with an embodiment of the present invention, different information objects of disparate types from different sources can be identified both by importance and urgency. Subsequently, each information object can be placed in a grid of four quadrants according to identified importance and urgency, each quadrant corresponding to a different combination of importance and urgency. Finally, the grid can be displayed in an attention manager interface to indicate which information objects require attention irrespective of the source or type for each of the information objects.

Figure 1A:
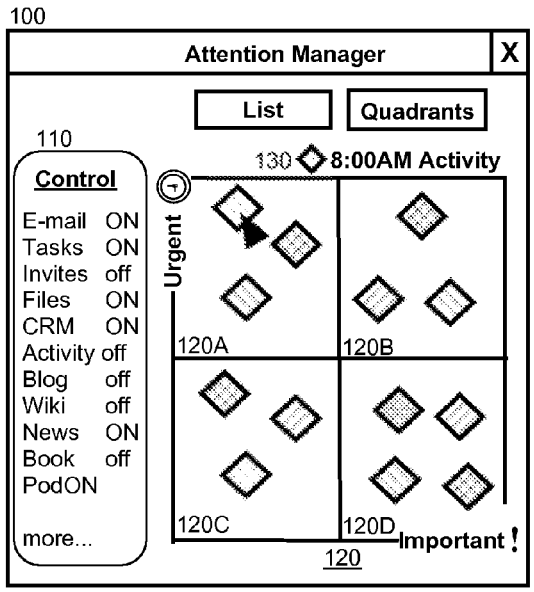
FIGS. 1A through 1D, taken together, are a pictorial illustration of an integrated view of multi-sourced information objects.

In further illustration, FIGS. 1A through 1D, taken together, are a pictorial illustration of an integrated view of multi-sourced information objects. FIG. 1A shows an attention manager 100. The attention manager 100 can include a control element 110 in which multiple different toggle-able types of information objects can be listed. Those types can include objects from collaborative computing environments like activities, tasks, meetings, and messages. The types also can include social networking content like Wikis, blogs, bookmarks and podcasts. Yet further, the types can include files and even elements from external information systems, to name only a few examples.

The attention manager 100 further can include a grid 120. The grid 120 can include different quadrants 120A, 120B, 120C, 120D, each corresponding to a different combination of importance and urgency. As such, each different information object can be represented within one of the quadrants 120A, 120B, 120C, 120D based upon a computed importance and urgency for the information object. The placement of each representation within the quadrants 120A, 120B, 120C, 120D can be discrete, or continuous meaning that a value for importance and a value for urgency can be computed on an information object by information object basis so that the placement of the representation for each object can be graphed into the quadrants 120A, 120B, 120C, 120D. Alternatively, each information object can be in one of four discrete states. In the former circumstance, the importance can be derived computationally from another of external factors accessible by the attention manager 100, such as the presence of a particular role or person.

In either case, the information objects represented within the quadrants 120A, 120B, 120C, 120D can be limited to those information objects having a type toggled on within the control 110. Thus, to facilitate the interpretation of the different representations of the information objects in the quadrants 120A, 120B, 120C, 120D, the representations each can be visually distinguished from one another by type. Further, each of the representations can be activated to respond to a proximity event such as a selection or mouse over in order to provide information 130 pertaining to the underlying information object as shown in FIG. 1A. The information 130 can be provided in a tool-tip adjacent to a responding representation, or in another location in the attention manager 100. Finally, upon selection of the representations, a corresponding underlying information object can be retrieved for direct interaction.

Figure 1B:
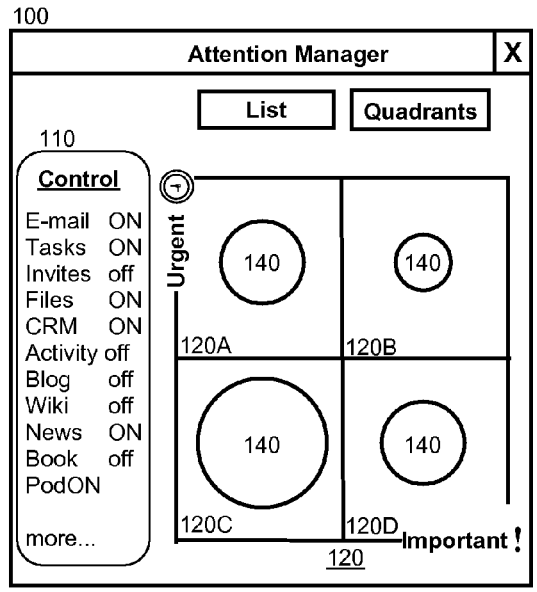

Referring now to FIG. 1B, it will be recognized by the skilled artisan that the grid 120 can become quite crowded when many different types in the control 110 are toggled on. Consequently, in an aspect of the embodiment, the representations can be grouped into a single element 140 in each of the respective quadrants 120A, 120B, 120C, 120D. The size of the single element 140 in each of the quadrants 120A, 120B, 120C, 120D can vary based upon a number of information objects represented in a respective one of the quadrants 120A, 120B, 120C, 120D. Selecting any of the single elements 140 can result in a listing of the information objects for more detailed inspection. Further zooming of a view to any of the quadrants 120A, 120B, 120C, 120D can be permitted in order to allow an end user to focus on a particular portion of the grid 120. Yet further, different information objects can be clustered together as a single element 140 when interrelated by a same project.

Figure 1C:
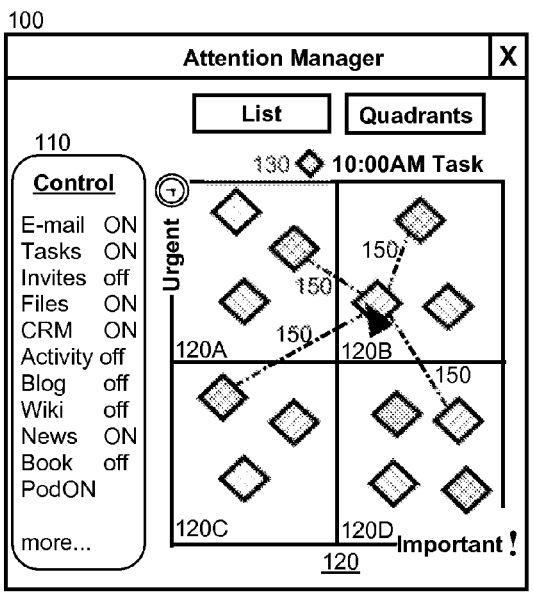
Figure 1D:
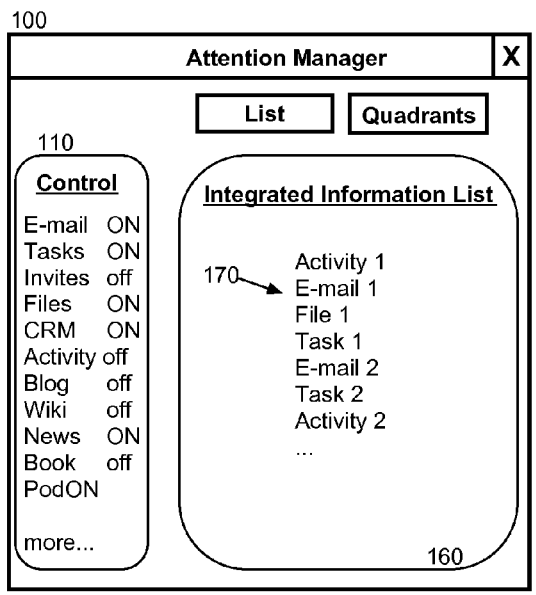

Referring now to FIG. 1C, the relationship between different information objects represented within the quadrants 120A, 120B, 120C, 120D of the grid 120 can be visually reflected as links 150 between an activated one of the representations in the quadrants 120A, 120B, 120C, 120D and other representations in the quadrants 120A, 120B, 120C, 120D for related information objects. Finally, referring to FIG. 1D, the grid 120 can be supplemented or replaced in the attention manager 100 with a listing 170 of the information objects, for example sorted by priority based upon a computed combination of importance and urgency.

Figure 2:
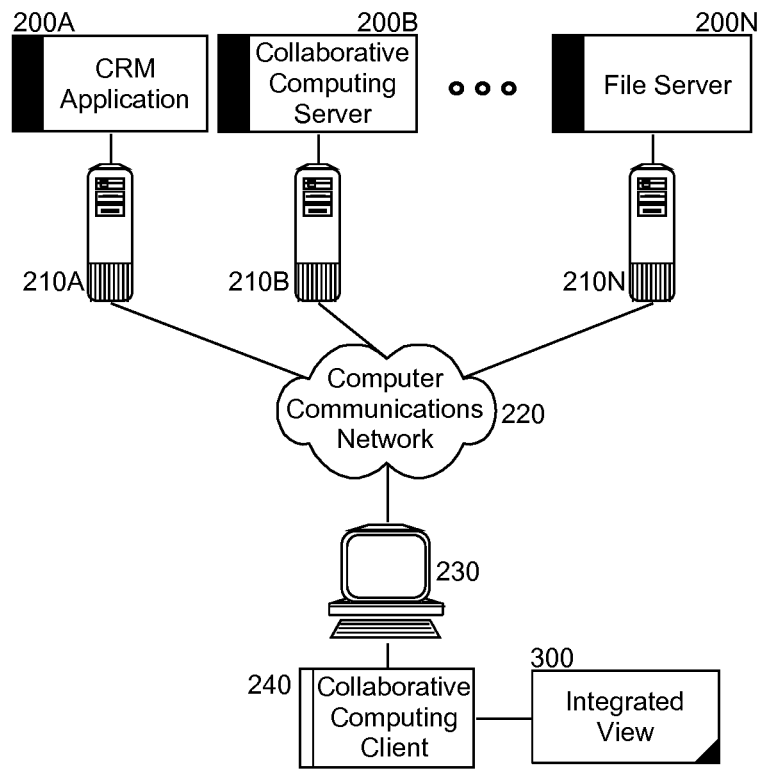
FIG. 2 is a schematic illustration of an information management data processing system configured for an integrated view of multi-sourced information objects; and, FIG. 3 is a flow chart illustrating a process for managing an integrated view of multi-sourced information objects.

The attention manager 100 can be generated within an information management data processing system. In illustration, FIG. 2 is a schematic illustration of an information management data processing system configured for an integrated view of multi-sourced information objects. The system can include multiple different host servers 210A, 210B, 210N, each supporting one or more sources of information objects, for example an external information system 200A, a collaborative computing server 200B such as the Domino™ product manufactured by IBM Corporation, or a file server 200N. Each of the host servers 210A, 210B, 210N can be configured for communicative coupling to a computing device 230 over computer communications network 220.

The computing device 230 can support the operation of a collaborative computing client 240 through which information objects can be received and processed from the different sources 200A, 200B, 200N. Further, integrated view logic 300 can be coupled to the collaborative computing client 240. The integrated view logic 300 can include program code enabled to render an attention manager with representations of different received information objects in a grid of quadrants, irrespective of the particular one of the sources 200A, 200B, 200N and the individual type for each of the information objects. The program code can be further enabled to place each representation for an information object in a particular quadrant according to a computed importance and urgency. The computed importance and urgency can range from discrete states to a tuple value on a continuous spectrum of importance and urgency.

Figure 3:
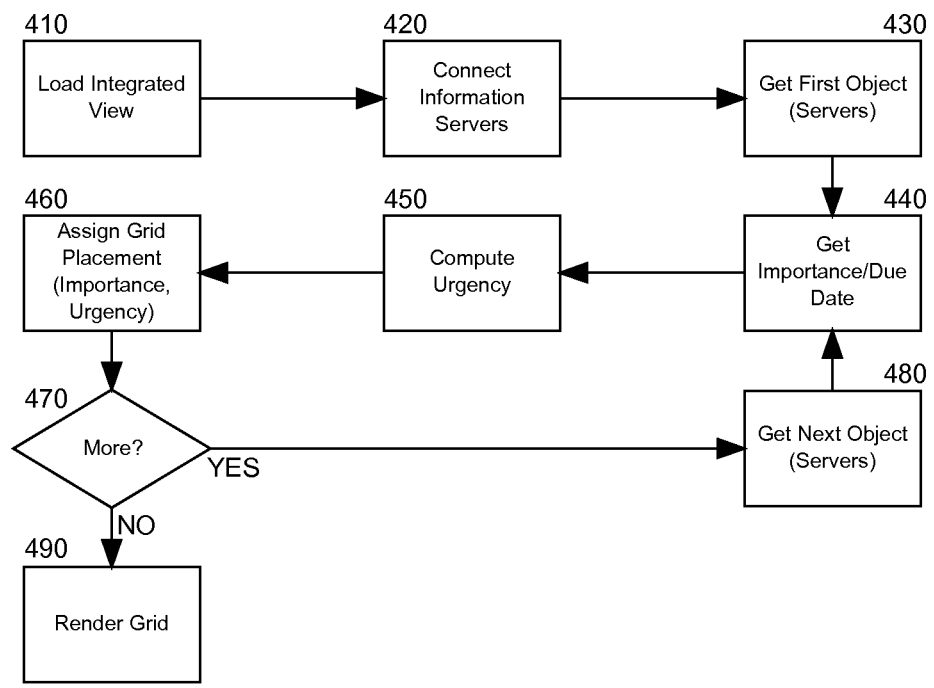

In yet further illustration of the operation of the integrated view logic, FIG. 3 is a flow chart illustrating a process for managing an integrated view of multi-sourced information objects. Beginning in block 410, an attention manager can be loaded for rendering and in block 420, a connection can be established with one or more information servers providing different information objects each associated with a sense of importance and urgency. In block 430, a first information object can be retrieved for consideration.

In block 440 an importance and an urgency can be determined for the information object. The importance can be one of a state such as "important" or "not important", or the importance can have a state within a range of states such as a range from "very important" to "somewhat important" to "unimportant". Yet further, the importance can have a numerical value on a continuous spectrum of importance. In block 450, a sense of urgency can be computed based upon a due date or due time for the information object. The result of the computation can be a state such as "urgent" or "not urgent", or the result of the computation can have a state within a range of states such as a range from "critically urgent" to "moderately urgent" to "not urgent". Yet further, the result of the computation can have a numerical value on a continuous spectrum of urgency.

In block 460, a representation for the information object can be placed in a position in a grid of quadrants based upon the importance and urgency for the information object. In this regard, the representation can be placed in a quadrant without respect to the actual location in the quadrant, so long as the underlying information object meets the importance and urgency criteria of the quadrant. Alternatively, the representation can be graphed into the grid in an appropriate quadrant based upon the values for the importance and computed urgency for the underlying information object. Thereafter, in decision block 470 if further information objects remain to be processed, in block 480 a next information object can be received and the process can repeat through block 440. When no further information objects remain to be processed, the process can end in block 490 with the rendering of the grid in the attention manager.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. An attention manager data processing system comprising:
   a computing device with memory and at least one processor;
   integrated view logic executing in the computing device; and,
   an attention manager user interface generated by program code of the integrated view logic, the user interface comprising:
   a grid of four sectors, each sector corresponding to a unique combination of importance and urgency, the sector further comprising representations of underlying information objects from multiple different source of information objects, each information object comprising a respective importance and urgency consistent with a corresponding one of the sectors, the grid being arranged with a first of the four sectors in an upper left hand corner of the grid containing objects of the highest urgency but lowest importance, a second of the four sectors in an upper right hand corner of the grid containing objects of the highest urgency and importance, a third of the four sectors in a lower right hand corner of the grid containing objects of a lowest urgency but highest importance, and a fourth of the four sectors in a lower left hand corner of the grid containing objects of a lowest urgency and importance; and,
   a toggle button configured to respond to activation by sorting a listing of the underlying information objects of the grid by a computed combination of importance based upon an association of a role or person with the information object and urgency based upon an impending deadline, and replacing the grid in the user interface with the listing of the underlying information objects of the grid sorted by priority based upon a computed combination of importance and urgency.

2. The system of claim 1, further comprising:
   a control element disposed in the attention manager user interface, the control element comprising a listing of toggle-able information object types;
   the program code of the integrated view logic being further enabled to limit a display of representations for information objects in the grid to information objects of corresponding types toggled on in the control element.

3. The system of claim 1, further comprising links linking a selected one of the representations in the sectors with related ones of the representations in the sectors.

4. The system of claim 1, wherein each of the representations is visually distinguished according to a type for an underlying information object.

5. The system of claim 1, wherein representations in each sector are grouped into a single visible element sized according to a number of the representations.

6. The system of claim 1, further comprising a listing of the information objects in the attention manager.

7. A method for managing an integrated view of multi-sourced information objects, the method comprising:
   retrieving different information objects of different types from different sources of information objects;
   determining an importance and urgency for each of the information objects;
   displaying a representation of each of the information objects in one of four sectors in a grid selected according to the importance and urgency of the representation, the grid being arranged with a first of the four sectors in an upper left hand corner of the grid containing objects of the highest urgency but lowest importance, a second of the four sectors in an upper right hand corner of the grid containing objects of the highest urgency and importance, a third of the four sectors in a lower right hand corner of the grid containing objects of a lowest urgency but highest importance, and a fourth of the four sectors in a lower left hand corner of the grid containing objects of a lowest urgency and importance; and, responsive to an activation of a toggle button, sorting a listing of the underlying information objects of the grid by a computed combination of importance based upon an association of a role or person with the information object and urgency based upon an impending deadline, and replacing the displayed grid with a display of the listing of the underlying information objects of the grid sorted by priority based upon a computed combination of importance and urgency.

8. The method of claim 7, further comprising filtering the grid to display representations for underlying information objects of a selected type.

9. The method of claim 7, further comprising displaying information for an information object responsive to a proximity event in the grid for a corresponding representation of the information object.

10. The method of claim 7, further comprising displaying links to representations of related information objects responsive to a proximity event in the grid for a corresponding representation of the information object.

11. The method of claim 7, further comprising listing the information objects in order of importance and urgency.

12. A computer program product comprising a non-transitory computer usable medium embodying computer usable program code for managing an integrated view of multi-sourced information objects, the computer program product comprising:

computer usable program code for retrieving different information objects of different types from different sources of information objects; computer usable program code for determining an importance and urgency for each of the information objects;

computer usable program code for displaying a representation of each of the information objects in one of four sectors in a grid selected according to the importance and urgency of the representation, the grid being arranged with a first of the four sectors in an upper left hand corner of the grid containing objects of the highest urgency but lowest importance, a second of the four sectors in an upper right hand corner of the grid containing objects of the highest urgency and importance, a third of the four sectors in a lower right hand corner of the grid containing objects of a lowest urgency but highest importance, and a fourth of the four sectors in a lower left hand corner of the grid containing objects of a lowest urgency and importance; and, responsive to an activation of a toggle button, sorting a listing of the underlying information objects of the grid by a computed combination of importance based upon an association of a role or person with the information object and urgency based upon an impending deadline, and replacing the displayed grid with a display of the listing of the underlying information objects of the grid sorted by priority based upon a computed combination of importance and urgency.

13. The computer program product of claim 12, further comprising computer usable program code for filtering the grid to display representations for underlying information objects of a selected type.

14. The computer program product of claim 12, further comprising computer usable program code for displaying information for an information object responsive to a proximity event in the grid for a corresponding representation of the information object.

15. The computer program product of claim 12, further comprising computer usable program code for displaying links to representations of related information objects responsive to a proximity event in the grid for a corresponding representation of the information object.

16. The computer program product of claim 12, further comprising computer usable program code for listing the information objects in order of importance and urgency.

* * * * *